: US 6,416,283 B1
Date of Patent: Jul. 9, 2002

(54) ELECTROCHEMICAL MACHINING PROCESS, ELECTRODE THEREFOR AND TURBINE BUCKET WITH TURBULATED COOLING PASSAGE

(75) Inventors: Robert A. Johnson, Simpsonville, SC (US); Ching-Pang Lee, Cincinnati, OH (US); Bin Wei, Mechanicville; Hsin-Pang Wang, Rexford, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/688,579

(22) Filed: Oct. 16, 2000

(51) Int. Cl.[7] .................................................. F01D 5/08
(52) U.S. Cl. ...................................................... 416/97 R
(58) Field of Search .............................. 416/97 R, 96 A, 416/95; 415/15; 219/69.11, 69.17, 69.1, 69.15, 69.14

(56) References Cited

U.S. PATENT DOCUMENTS

| | | | | |
|---|---|---|---|---|
| 5,695,322 A | * | 12/1997 | Jackobson et al. | ........ 416/97 R |
| 5,738,493 A | * | 4/1998 | Lee et al. | ................. 416/97 R |
| 5,980,209 A | * | 11/1999 | Barry et al. | .............. 416/97 R |
| 6,200,439 B1 | * | 3/2001 | Wei et al. | ................... 204/284 |
| 6,234,752 B1 | * | 5/2001 | Wei et al. | ................. 416/96 R |
| 6,303,193 B1 | * | 10/2001 | Guida et al. | ................ 427/555 |

* cited by examiner

Primary Examiner—F. Daniel Lopez
Assistant Examiner—Igor Kershteyn
(74) Attorney, Agent, or Firm—Nixon & Vanderhye

(57) ABSTRACT

An electrode having a dielectric coating is patterned to provide axially spaced rows of insulating material on the external surface of the electrode with one or more gaps in the insulating material of each row. The electrode is placed in a preformed hole of a turbine bucket and an electrolyte is provided for flow between the electrode and the walls of the hole. Upon application of an electrical current, portions of the material of the interior wall surface directly opposite the non-insulated portions of the electrode are dissolved, forming grooves. The insulated portions of the electrode leave axially spaced rows of projections extending toward the axis of the hole. The gaps in the rows or projections are axially misaligned. The projections form turbulators in the cooling flow passages of the bucket, enhancing the heat transfer coefficient.

13 Claims, 3 Drawing Sheets

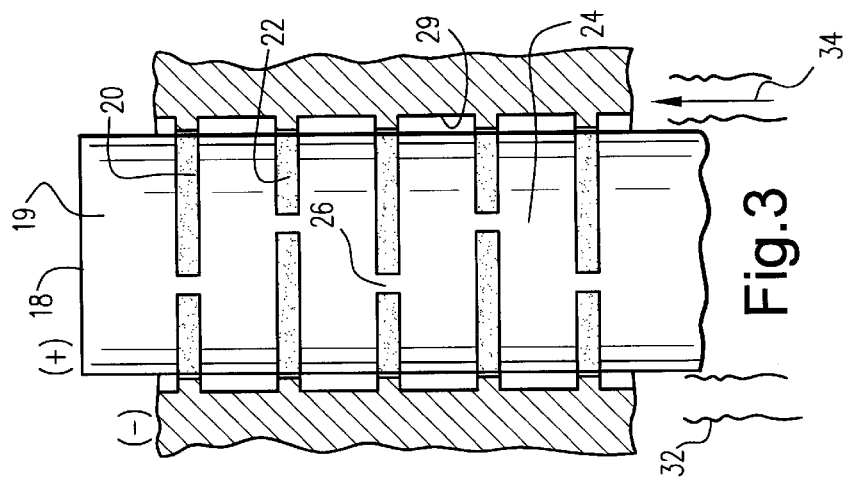
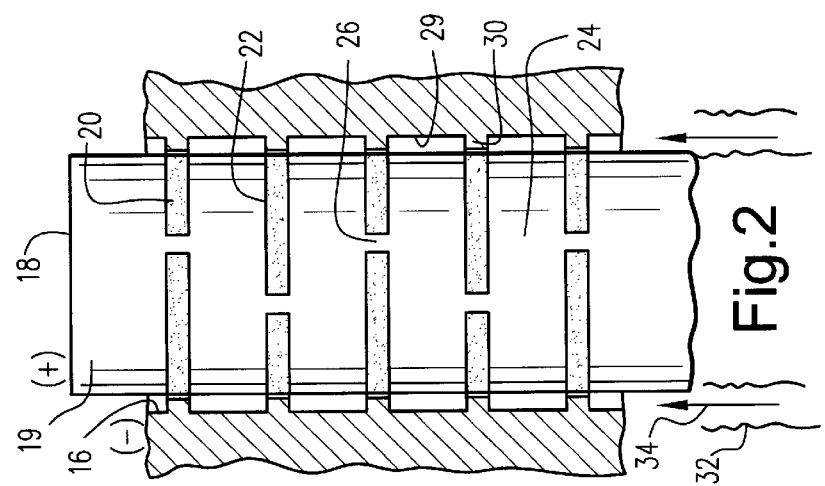
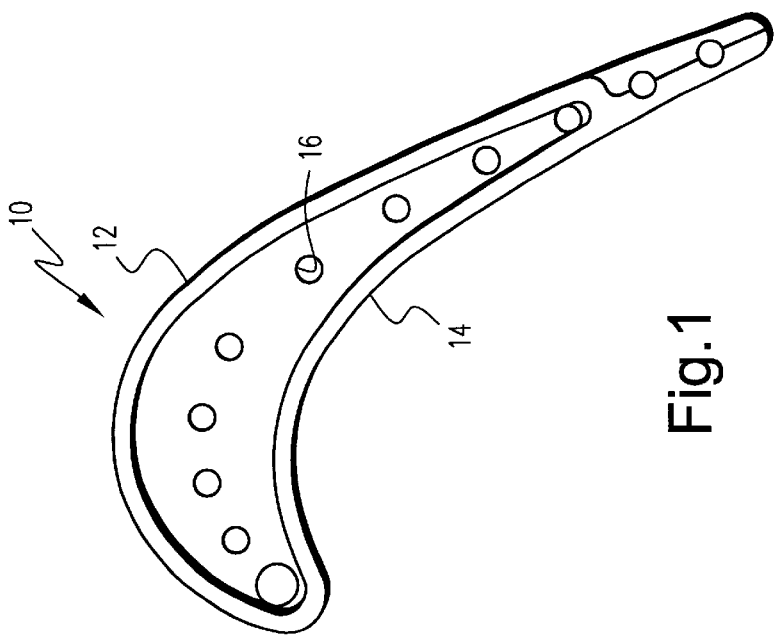

ELECTROCHEMICAL MACHINING PROCESS, ELECTRODE THEREFOR AND TURBINE BUCKET WITH TURBULATED COOLING PASSAGE

CROSS-REFERENCE TO RELATED APPLICATIONS

This application is related to commonly-assigned applications Serial No. 60/149,616, titled "A Method and Tool for Electrochemical Machining"; No. 60/149,618, titled "A Method and Tool for Electrochemical Machining"; No. 60/149,617, titled "A Method and Tool for Electrochemical Machining"; Ser. No. 09/187,663, titled "A Method and Tool for Electrochemical Machining"; Ser. No. 09/187,664, titled "Process for Fabricating a Tool Used in Electrochemical Machining" and No. 60/149,619, titled "A Method and Tool for Electrochemical Machining," the subject matters of which are incorporated herein by reference.

BACKGROUND OF THE INVENTION

The present invention relates to an electrode for electrochemical machining interior surfaces of cooling passages for a turbine bucket, a method therefor and a turbine bucket having the machined interior surface.

Electrochemical machining known as shaped-tube electrochemical machining (STEM) is used for drilling small, deep holes in electrically conductive materials. STEM is a non-contact electrochemical drilling process for producing holes with high aspect ratios such as 300:1. The aspect ratio is the ratio of the length or depth of the hole to the largest lateral dimension, e.g., diameter, of the hole which, in certain specific applications, can be as small as a few millimeters. STEM is used, e.g., to form the deep holes used as cooling passages for the buckets in gas turbines.

Gas turbine efficiencies are directly proportional to the temperature of turbine gases flowing along the hot gas path and driving the turbine blades. Gas turbines typically have operating temperatures on the order of 2700° F. To withstand these high temperatures, the buckets are manufactured from advanced materials and typically include smooth bore cooling passages for flowing a cooling medium for cooling the buckets. The cooling medium is typically compressor discharge air. The passages also conventionally extend from the bucket root to the bucket tip. While smooth-bore passages have been utilized, turbulence promoters, e.g., turbulators, are used in many gas turbine buckets to enhance the internal heat transfer coefficient. The heat transfer enhancement can be as high as 2.5 times as compared with smooth-bore passages for the same cooling flow rate. Turbulators conventionally comprise internal ridges or roughened surfaces along the interior surfaces of the cooling passages and are typically cast inside the cooling passages using ceramic cores. In many currently used turbines, however, many of the buckets have interior cooling passages with smooth interior wall surfaces formed by the casting process and therefore do not obtain the enhanced cooling effects otherwise available with turbulators.

The STEM technique identified above and described in the above-identified applications incorporated herein by reference employ an electrode having an insulating dielectric material or coating applied on the electrode surface in a pattern which, in conjunction with an electrolyte and the application of an electrical current between the electrode and the workpiece (bucket) displaces, i.e., dissolves, metal from the adjacent parts of the cooling passage wall to form projections and grooves along the interior surface. That is, the metallic portions of the interior surface of the cooling passage wall directly adjacent the insulated portions of the electrode when inserted into the preformed hole are not electrochemically removed, while the portions thereof directly adjacent the non-insulated portions of the electrode are electrochemically removed to form grooves in the interior wall portions of the cooling passage defining the projections therebetween. Certain of the foregoing applications are directed to the electrochemical machining process for forming projections and grooves along the interior wall surfaces.

BRIEF SUMMARY OF THE INVENTION

In accordance with a preferred embodiment of the present invention, there is disclosed an electrochemical machining process for forming axially spaced rows of projections, i.e., turbulators, along the interior wall surfaces of the cooling passages with gaps in each row to form cooling passages in buckets having enhanced heat transfer characteristics, i.e., enhanced internal heat transfer coefficients. To accomplish the foregoing, the present invention provides an electrode having an insulating dielectric coating about its entire exterior surface. Portions of the coating on the electrode are removed to form a desired turbulator pattern. That is, retained insulated portions of the electrode will correspond to the locations of the projections to be formed along the interior wall surface of the cooling passages of the bucket. The non-insulated portions of the electrode correspond in location to the grooves and gaps to be formed along the interior surfaces of the cooling passages. For example, the insulated portions of the electrode are spaced 0.100 inches apart in an axial direction along the length of the electrode (corresponding to the radial direction of the bucket) and may have a width on the order of 0.010 inches. By inserting the patterned electrode into the preformed (predrilled or cast) cooling passage and circulating an electrolyte, the application of an electric current between the electrode and the workpiece (bucket) electrochemically removes material along the interior wall surface of the cooling passage adjacent non-insulated portions of the electrode to form the grooves or gaps therein. The material of the interior surface of the cooling passage adjacent the insulated portions of the electrode are not removed and therefore form the projections extending toward the axis of the hole.

A particular advantage of the turbulator pattern described above is that the electrode is relatively easy to fabricate. Moreover, the resulting pattern of turbulators along the interior surface of the cooling passages have greatly enhanced heat transfer characteristics. Particularly, the radial flow of cooling medium during turbine operation from the bucket root toward the bucket tip interacts with the bucket rotation and creates a coriolis effect to flow the cooling medium from the leading face (suction side) toward the trailing face (pressure side). The combination of this secondary flow with the radial flow forms a complicated flow field within the cooling passage having enhanced heat transfer characteristics. The radial flow sheds vortices from the turbulators and the interruptions, i.e., gaps, and the secondary flow circulates the vortices around the passage walls to enhance the surface heat transfer coefficient.

In a preferred embodiment according to the present invention, there is provided a process for forming interrupted raised projections and grooves therebetween perimetrically about an interior surface of a preformed elongated hole in a workpiece, comprising the steps of (a) locating within the hole an electrode having electrical insulating material arranged in axially spaced, perimetrically extending rows, interrupted by at least one gap, forming a pattern of insulated and non-insulated portions of the electrode about an outer surface of the electrode in general opposition to intended locations of the projections and grooves, respectively, about the interior surface of the hole, (b) flowing an electrolyte between the electrode and the interior surface of the hole of the workpiece and (c) passing an electric current between the electrode and the workpiece to form the perimetrically interrupted axially spaced rows of projections and grooves along the interior surface of the hole.

In a further preferred embodiment of the present invention, there is provided an electrode for forming interrupted raised projections and grooves therebetween perimetrically about an interior surface of an elongated hole in a workpiece, comprising an elongated electrode body having a long axis and coated with a dielectric material in a pattern having a plurality of axially spaced rows extending perimetrically about the body in planes generally normal to the axis, each row having at least one gap at a predetermined perimetric location along the row, surface area portions of the electrode body between said rows of dielectric material and in the gaps being exposed for electrical contact with an electrolyte upon insertion of the electrode body into the hole and application of an electrical current between the electrode body and the workpiece.

In a still further preferred embodiment according to the present invention, there is provided a bucket for a turbine having at least one generally elongated cooling passage extending along the bucket generally from the bucket root to the bucket tip and having an axis, the cooling passage having a perimetrical interior surface with rows of axially spaced raised projections extending generally perpendicular to and toward the axis, each projection being interrupted by a gap defining a recess extending generally in a direction away from the axis.

BRIEF DESCRIPTION OF THE DRAWINGS

FIG. 1 is a schematic illustration of a profile of a bucket for a turbine illustrating the generally radially extending cooling flow passages through the bucket;

FIGS. 2 and 3 are cross-sectional views of a cooling passage in the bucket with an electrode disposed in the passage to form the turbulators, the drawing figures being taken along lines 2—2 and 3—3, respectively, of FIG. 4;

DETAILED DESCRIPTION OF THE INVENTION

Figure 6:
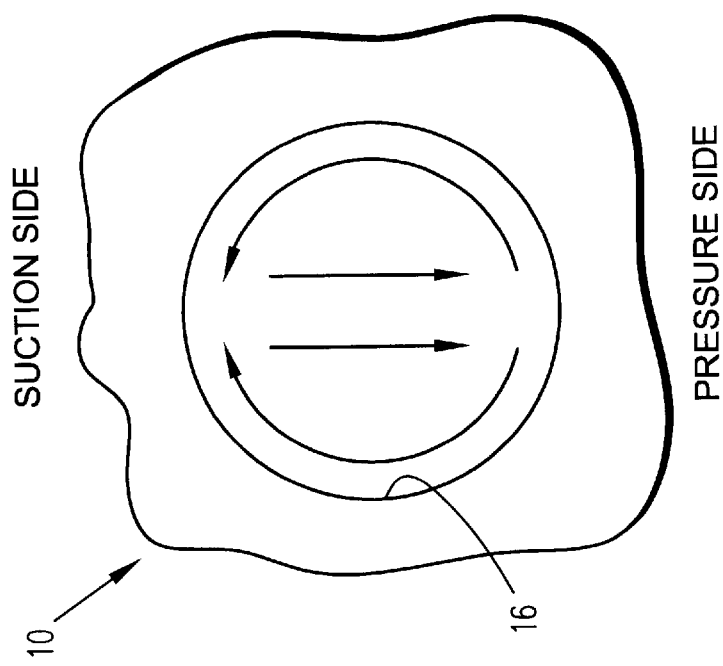
FIG. 6 is an illustration of the flow pattern within the cooling passage with the turbulators fabricated in accordance with the present invention.
Figure 4:
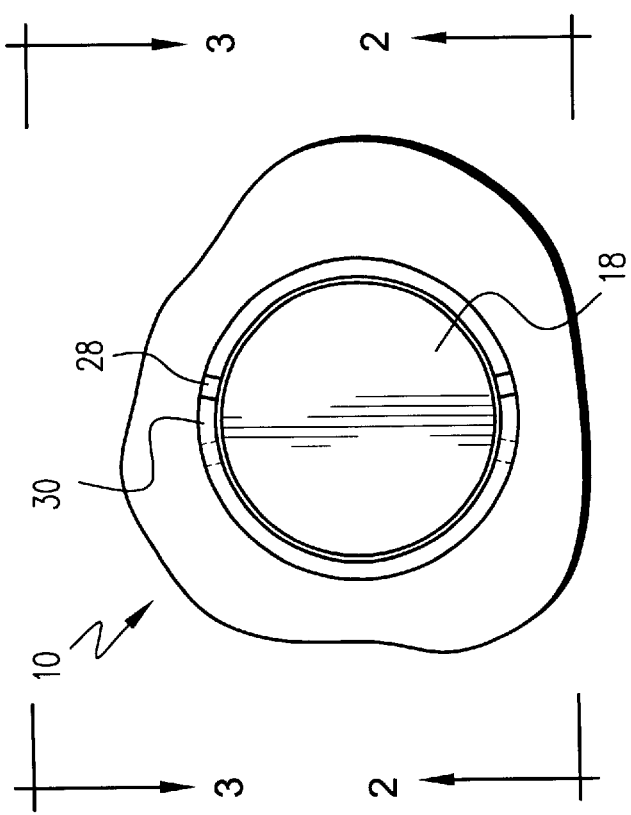
FIG. 4 is a plan view illustrating the electrode within the cooling passage.

Referring now to the drawings, particularly to FIG. 1, there is illustrated a turbine bucket, generally designated 10, having a suction side 12, a pressure side 14 and a plurality of cooling passages 16 extending from the root of the bucket to its tip. Typically, compressor discharge air is provided for flow through the cooling passages 16 to cool the bucket 10. The cooling passages 16 are formed when the buckets are cast and conventionally have smooth bores, i.e., smooth interior wall surfaces. The present invention provides a method and an electrode for refurbishing previously cast smooth bore cooling passages to provide enhanced heat transfer characteristic, i.e., provide turbulators within the passages, as well as a method for forming turbulated passages as part of original equipment buckets.

Referring to FIGS. 2 and 3, there is illustrated a cooling passage 16 formed by an electrochemical machining process according to the present invention using an electrode 18 disposed within a preformed, e.g., precast or predrilled hole 16. Preferably, electrode 18 may be formed of a body 19 comprised of a hollow cylindrical metal tube having a dielectric, i.e., electrically insulating, coating 20 formed along an exterior surface. As illustrated, the dielectric coating 20 is arranged in a pattern of rows 22 which are axially spaced one from the other in the axial direction of the cooling passage 16 (the cooling passages 16 extend generally radially along the turbine bucket but for purposes of describing the cooling passage per se, the term "axial" or "axially" is used to define the length direction of the cooling passage). To form the rows 22 of dielectric material 20, the electrode 18 is initially entirely coated about its perimetrical surface, in the illustrated form that surface being the cylindrical exterior surface of the electrode 18. The coating is then removed, for example, by laser ablation, to form the pattern of dielectrically insulated portions, i.e., the rows 22, and non-insulated portions, i.e., the portions 24 between the rows 22 of dielectric material. Gaps 26 are also provided in the rows 22 of insulating material, the gaps 26 interrupting the rows 22. The portions 24 and gaps 26 thus comprise the non-insulated electrode portions which cooperate with an electrolyte passed between the electrode 18 and the walls 16 of the cooling passages and the application of an electrical current between electrode 18 and the bucket 10 to remove metal along the interior wall surface directly adjacent these exposed non-insulated metal portions to form the grooves 29 between projections 30 along the interior wall surface. The gaps 26 are formed in the pattern of insulating material to provide recesses or gaps 28 in the ridges or projections 30 formed by the removal of the material, at least two gaps per row being preferred. For example, as illustrated in FIG. 5, the gaps 26 in the insulating material of the rows 22 of the electrode form the gaps 28 along the rows 30 which form the turbulators of the cooling passages.

More particularly, with the electrode 18 located in the preformed hole 16 with the insulated and non-insulated portions in lateral registration with the portions of the interior wall surface of the passage in which the projections 30, gaps 28 and grooves 29 are to be formed, an electrolyte solution 32 is circulated through the body of the electrode 18 for return flow between the electrode and the interior wall surfaces, as indicated by the arrows 34. Alternatively, the electrode 18 may be solid and the electrolyte flow may be commenced adjacent one end of the passage for flow toward and exiting from the opposite end of the passage 16. Consequently, the electrolyte flows between the interior wall surface of passage 16 and the non-insulated and insulated portions of the metal electrode 18. Upon application of an electrical current between the electrode 18 and the workpiece, i.e., the bucket 10, the electrically-insulated portions 20 block the current flow from the electrode 18 toward the interior wall surfaces of the passages 16 such that the metal of the adjacent surfaces is not removed. The current, however, passing from the non-insulated portions 24 and 26 of the electrode 18 dissolves the metal material along the interior wall surface of the cooling passages directly adjacent those non-insulated portions. As a result, and referring to FIG. 5, the projections 30 extend inwardly toward the axis of the hole 16, the projections 30 comprising the material adjacent the insulated portions 22 which is not removed by the electrical current flowing from the electrode through the electrolyte to the workpiece. The grooves 29 formed between the axially spaced rows of projections 30, as well as the gaps 28 interrupting the rows of projections, are, of course, formed by the removal or dissolution of the metal of the interior wall surface by the electrical current flowing from the electrode 18 through the electrolyte to the workpiece. It will, therefore, be appreciated that the pattern on the interior wall surface of the cooling passage 16 is a mirror image of the insulated and non-insulated portions of the dielectric material on the electrode 18.

Figure 5:
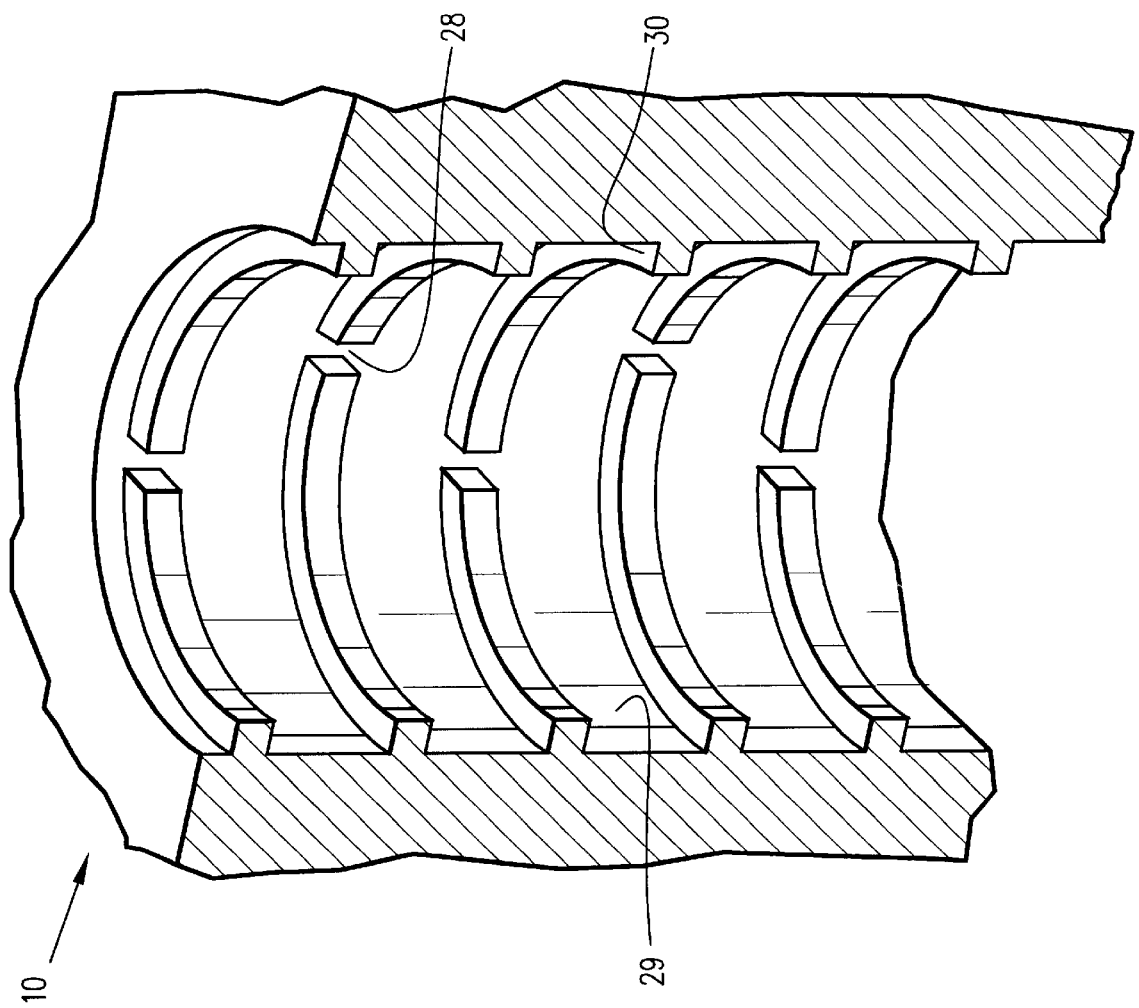
FIG. 5 is an enlarged cross-sectional view illustrating half of a cooling passage with turbulators formed in accordance with the present invention.

From a review of FIG. 5, it will be appreciated that the gaps 28 of adjacent rows 30 are preferably axially misaligned with one another. The gaps 28, however, can be axially aligned with one another, if desired. Also, from FIGS. 2 and 3, it will be appreciated that there are at least two gaps 26 in each of the rows 22 of insulation material, thus forming at least two corresponding gaps 28 in the rows of projections 30. A greater number of gaps 28 may be provided if desired. The combination of the gaps and projections forms a desirable complicated flow field within the cooling passages as the bucket rotates about the axis of the turbine. During turbine operation, the radial flow from the bucket root toward the bucket tip interacts with the bucket rotation and creates a coriolis effect to flow the cooling medium from the leading face (suction side) toward the trailing face (pressure side) in a flow pattern, as illustrated by the arrows in FIG. 6. The radial flow sheds vortices from the projections 30 and the interruptions, i.e., the gaps 28 and the secondary flow circulates the vortices around the passage walls to enhance the surface heat transfer coefficient.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for forming interrupted raised projections and grooves therebetween perimetrically about an interior surface of a preformed elongated hole in a workpiece, comprising the steps of:
   (a) locating within the hole an electrode having an electric insulating material arranged in axially spaced, perimetrically extending rows, interrupted by at least one gap, forming a pattern of insulated and non-insulated portions of the electrode about an outer surface of the electrode in general opposition to intended locations of the projections and grooves, respectively, about the interior surface of the hole;
   (b) flowing an electrolyte between said electrode and the interior surface of the hole of the workpiece; and
   (c) passing an electric current between the electrode and the workpiece to form the perimetrically interrupted axially spaced rows of projections and grooves along the interior surface of the hole.

2. A process according to claim 1 including, prior to step (a), providing the insulating material on the outer surface of the electrode in axially spaced rows thereof with said gaps in the insulating material of adjacent rows axially misaligned with one another.

3. A process according to claim 1 including, prior to step (a), coating the exterior surface of the electrode with the insulating material and removing the insulating material from predetermined exterior surface portions of the electrode at locations thereabout for forming the grooves between said projections.

4. A process according to claim 3 including removing the insulating material from the exterior surface portions at locations forming gaps in the rows of insulating material misaligned with one another in the axial direction of the electrode.

5. A process according to claim 1 including, prior to step (a), drilling the hole in the workpiece and locating the electrode in the predrilled hole.

6. A process according to claim 1 including locating the electrode in a precast hole of a cast workpiece.

7. An electrode for forming interrupted raised projections and grooves therebetween perimetrically about an interior surface of an elongated hole in a workpiece, comprising:
   an elongated electrode body having a long axis and coated with a dielectric material in a pattern having a plurality of axially spaced rows extending perimetrically about the body in planes generally normal to said axis, each said row having at least one gap at a predetermined perimetric location along said row, surface area portions of said electrode body between said rows of dielectric material and in said gaps being exposed for electrical contact with an electrolyte upon insertion of the electrode body into the hole and application of an electrical current between the electrode body and the workpiece.

8. An electrode according to claim 7 wherein said body is cylindrical.

9. An electrode according to claim 7 wherein the gaps interrupting adjacent rows are axially misaligned with one another.

10. An electrode according to claim 7 including at least two gaps in at least one row thereof.

11. An electrode according to claim 7 wherein said body is cylindrical and the gaps interrupting adjacent rows are axially misaligned with one another, each row having at least two gaps in axial misalignment with the two gaps of adjacent rows thereof.

12. A bucket for a turbine having at least one generally elongated cooling passage extending along the bucket generally from a root of the bucket to a tip of the bucket and having an axis, said cooling passage having a perimetrical interior surface with rows of axially spaced raised projections extending generally perpendicular to and toward said axis, each said projection being interrupted by a gap defining a recess extending generally in a direction away from said axis, said gaps interrupting adjacent rows of projections and being axial misaligned relative to one another.

13. A bucket for a turbine having at least one generally elongated cooling passage extending along the bucket generally from a root of the bucket to a tip of the bucket and having an axis, said cooling passage having a perimetrical interior surface with rows of axially spaced raised projections extending generally perpendicular to and toward said axis, each said projection being interrupted by a gap defining a recess extending generally in a direction away from said axis, each said row having a pair of perimetrically spaced gaps, said gaps interrupting adjacent rows of projections being axially misaligned with one another.

* * * * *